(No Model.)
W. M. BRUNSON.
PLOW.
No. 356,705. Patented Jan. 25, 1887.
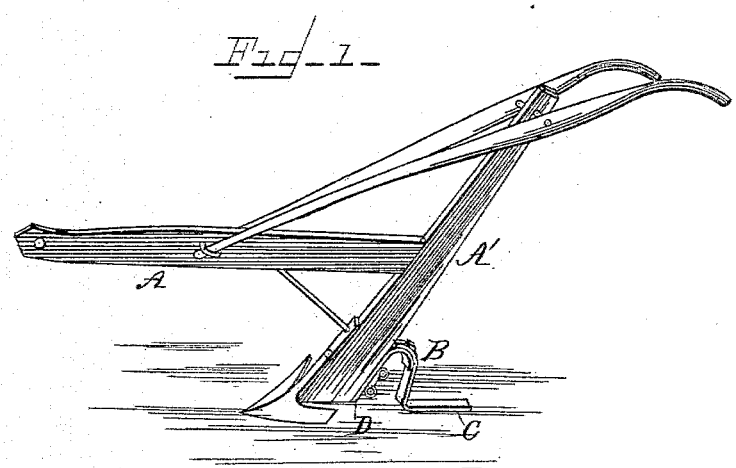
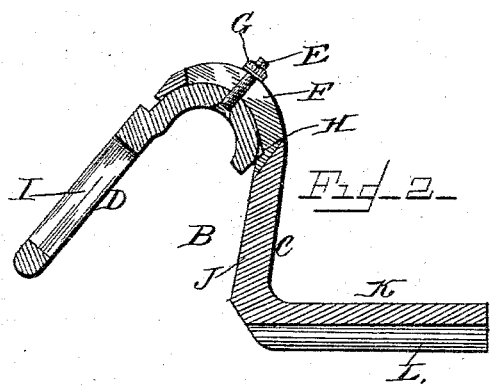
Witnesses
R. H. Bishop.
S. M. Lusby.
Inventor
W. M. Brunson,
By his Attorney

UNITED STATES PATENT OFFICE.

WILLIAM MATTHEW BRUNSON, OF DARLINGTON, SOUTH CAROLINA.

PLOW.

SPECIFICATION forming part of Letters Patent No. 356,705, dated January 25, 1887.

Application filed July 20, 1886. Serial No. 208,516. (No model.)

*To all whom it may concern:*

Be it known that I, WILLIAM MATTHEW BRUNSON, a citizen of the United States, residing at Darlington, in the county of Darlington and State of South Carolina, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in attachments for plows; and its object is to provide a device which will act as a gage for regulating the depth of the furrow and as a guide to keep the plow to its path. These objects I secure by the construction shown in the accompanying drawings, as will be hereinafter fully described, and pointed out in the claims.

In the drawings, Figure 1 is a perspective view of a plow provided with my attachment, and Fig. 2 is a detail sectional view of the attachment.

A is an ordinary double-sweep plow, and B designates my attachment, which is secured to the rear side of the standard A' at its lower end, as clearly shown in Fig. 1.

My attachment consists of the guide or main bar C and the support or supplemental bar D. These bars are both curved at their upper ends, as shown, and the end of the main bar C is placed over and rests upon the end of the bar D. A bolt, E, is secured in the curved portion of the bar D and extends up through a slot, F, in the bar C, as shown, and the two bars are secured together by tightening up a nut, G, on the bolt E, as will be readily understood. The end of the bar D is provided with an offset or shoulder, H, which fits in the slot F, and thereby holds the two bars in alignment. The main portion of the support or bar D is provided with a slot, I, through which and the standard A' a bolt is passed to secure the device in place. The guide or main bar C consists of an upright arm, J, having its upper end curved, as above described, and having its lower end bent to form the horizontal arm K. This horizontal arm K rides on the ground and is provided on its under side with a rib, L, which serves to keep it in the line of the furrow.

From the foregoing the construction of my device will be fully understood, and it is thought its advantages and operation will be apparent.

When the plow is in use, the guide C will run in the furrow, and the depth of the furrow is regulated by adjusting the device by means of the slots F and I and the bolts passed through the same.

By the use of my device the work of plowing and cultivating will be greatly lessened and expedited, as the guide will aid in keeping the plow in the furrow, and by properly adjusting the parts the plow can be set to plow to a greater or less depth, according to the conditions of the crop and the requirements of the ground.

Having thus described my invention, what I claim, and desire to secure by Letters Patent, is—

1. The combination, with the plow-standard, of the support adjustably secured thereto and having its upper end curved and provided with an offset or shoulder and the guide having its upper end curved over the curved end of the support and provided with a slot for the reception of the offset or shoulder on the curved end of the support, substantially as specified.

2. The combination, with the plow-standard, of the support adjustably secured thereto and having its upper end curved and the guide having its upper end curved over the curved end of the support and slotted and having its lower portion forming a horizontal arm provided on its under side with a rib, substantially as shown and described.

In testimony whereof I affix my signature in presence of two witnesses.

WILLIAM MATTHEW BRUNSON.

Witnesses:
J. H. NONNENT,
D. H. TRAXLER.